United States Patent
Souers et al.

(10) Patent No.: US 11,156,279 B2
(45) Date of Patent: Oct. 26, 2021

(54) TORQUE CONVERTER WITH FLOW-CONTROL SLEEVE

(71) Applicant: SCHAEFFLER TECHNOLOGIES AG & CO. KG, Herzogenaurach (DE)

(72) Inventors: Long Souers, North Canton, OH (US); Drew Hilty, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 22 days.

(21) Appl. No.: 16/717,193

(22) Filed: Dec. 17, 2019

(65) Prior Publication Data

US 2021/0180670 A1 Jun. 17, 2021

(51) Int. Cl.
*F16H 45/02* (2006.01)

(52) U.S. Cl.
CPC ....... *F16H 45/02* (2013.01); *F16H 2045/021* (2013.01); *F16H 2045/0294* (2013.01)

(58) Field of Classification Search
CPC .................................. F16H 45/02–2045/0294
See application file for complete search history.

(56) References Cited

U.S. PATENT DOCUMENTS

| 8,919,509 | B2 * | 12/2014 | Maienschein | F16H 45/02 192/3.3 |
| 8,967,349 | B2 * | 3/2015 | Ushio | F16D 33/18 192/3.29 |
| 9,303,747 | B2 * | 4/2016 | Mototsune | F16D 25/0635 |
| 10,767,756 | B2 * | 9/2020 | Sabo | F16H 57/082 |
| 2011/0120829 | A1 | 5/2011 | Vanni et al. | |
| 2013/0224002 | A1 | 8/2013 | Ito et al. | |
| 2015/0300473 | A1 | 10/2015 | Smith | |
| 2017/0002908 | A1 * | 1/2017 | Saka | F16H 45/02 |

\* cited by examiner

*Primary Examiner* — David R Morris
*Assistant Examiner* — James J Taylor, II
(74) *Attorney, Agent, or Firm* — Dickinson Wright PLLC

(57) ABSTRACT

A torque converter includes an impeller and a turbine configured to fluidly couple with the impeller. A bypass clutch has a hydraulically actuated piston, an apply chamber, and a compensation chamber. A turbine hub is attached to the turbine and has an inner circumferential surface defining axially extending teeth configured to connect with a shaft. A flow-control sleeve is axially spaced from the turbine hub and has a radial tab portion attached to the turbine. The sleeve defines an orifice in fluid communication with the apply chamber or the compensation chamber.

16 Claims, 4 Drawing Sheets

TORQUE CONVERTER WITH FLOW-CONTROL SLEEVE

TECHNICAL FIELD

The present disclosure relates to torque converters.

BACKGROUND

Automatic transmissions may include a torque converter for coupling a transmission input shaft to a crankshaft of an engine. The torque converter may include an impeller fixed to the crankshaft, a turbine fixed to the input shaft, and a stator disposed between the impeller and the turbine. The torque converter may also include a bypass clutch to mechanically couple the transmission input shaft to the case of the torque converter, which is fixed to the crankshaft.

SUMMARY

According to one embodiment, a torque converter includes an impeller and a turbine configured to fluidly couple with the impeller. A bypass clutch has a hydraulically actuated piston, an apply chamber, and a compensation chamber. A turbine hub is attached to the turbine and has an inner circumferential surface defining axially extending teeth configured to connect with a shaft. A flow-control sleeve is axially spaced from the turbine hub and has a radial tab portion attached to the turbine. The sleeve defines an orifice in fluid communication with the apply chamber or the compensation chamber. The sleeve may define another orifice in fluid communication with the other of the apply chamber and the compensation chamber.

According to another embodiment, a torque converter includes a cover, an impeller including impeller blades non-rotatably fixed relative to the cover, and a turbine including a shell and turbine blades configured to fluidly couple with the impeller blades. A bypass clutch has a friction disc and a hydraulically actuated piston. An apply chamber is configured to stroke the piston into the friction disc to engage the bypass clutch, and a compensation chamber configured to de-stroke the piston to disengage the bypass clutch. A turbine hub is attached to the shell and has an inner circumferential surface defining axially extending teeth configured to connect with a shaft. A flow-control sleeve has a radial tab portion attached to the shell. The sleeve defines an orifice in fluid communication with one of the apply chamber and the compensation chamber.

According to yet another embodiment, a torque converter includes an impeller and a turbine configured to fluidly couple with the impeller. A bypass clutch has a hydraulically actuated piston, an apply chamber, and a compensation chamber. A turbine hub is fixed to the turbine and has an inner circumferential surface defining axially extending teeth configured to connect with a shaft. A flow-control sleeve is axially spaced from the turbine hub and fixed to the turbine. The sleeve defines a first orifice in fluid communication with the apply chamber and a second orifice in fluid communication with the compensation chamber.

DETAILED DESCRIPTION

Figure 1:
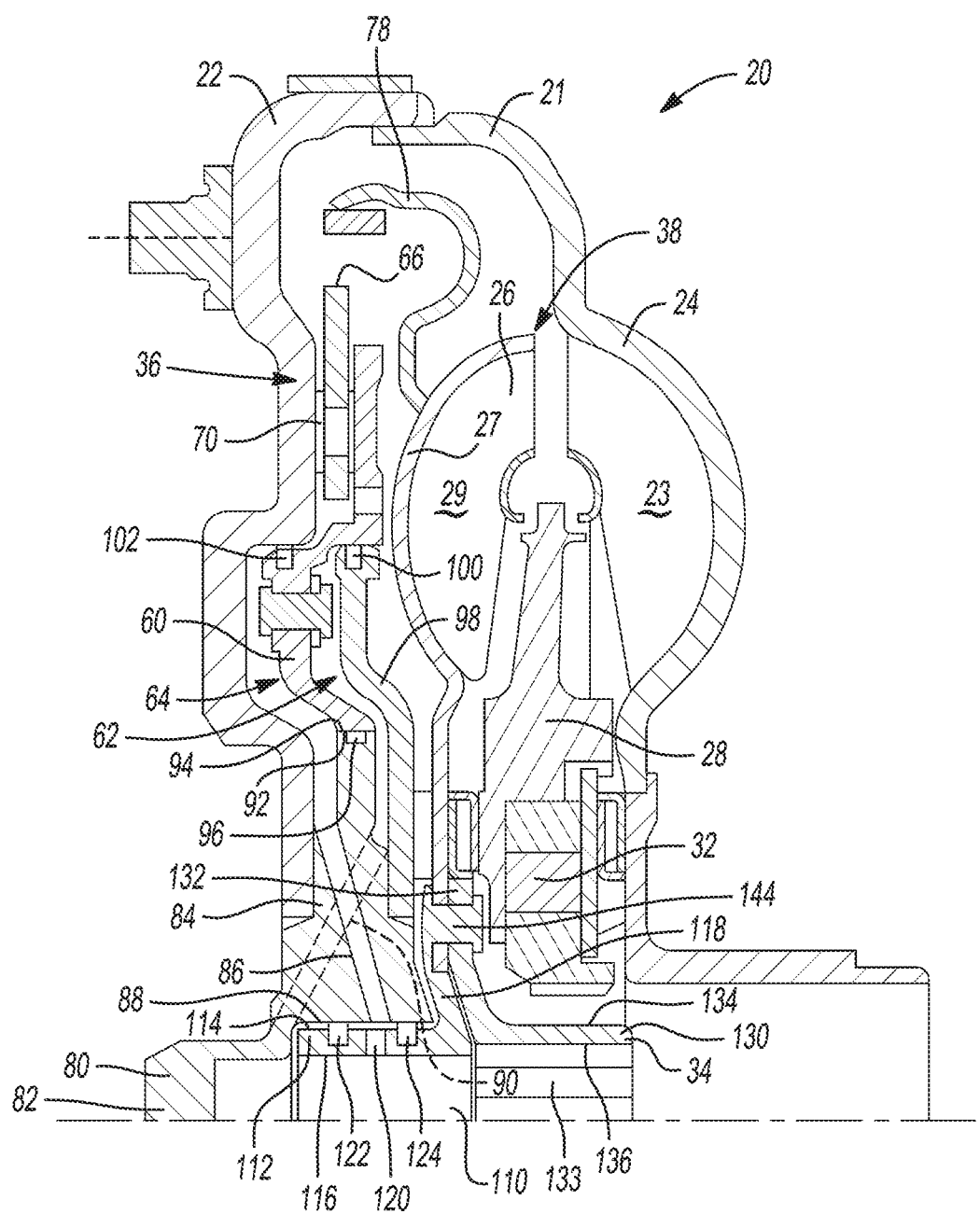
FIG. 1 is a schematic cross-sectional view of a torque converter.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surface faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Referring to FIG. 1, a torque converter 20 may be used in a vehicle to couple an automatic transmission to a powerplant, e.g., an engine. For example, the torque converter 20 includes a cover 22 connect to a crankshaft of the engine. An impeller 24 is non-rotatably fixed to the cover 22 and rotates with the crankshaft. Components that are non-rotatably fixed rotate in unison. The impeller 24 may include a shell 21 and blades 23. A turbine 26 is adjacent to the impeller 24 within a hydrodynamic chamber 38 of the torque converter 20. The turbine 26 may include a shell 27 and blades 29 fixed to the shell 27. The shell 27 extends radially inward to connect with a turbine hub 34 that is connected, e.g., splined, to a transmission input shaft that supplies power to the transmission.

A stator 28 is coupled to a stator shaft (not shown) by a one-way clutch 32. The stator shaft is fixed to a front support of the transmission and is stationary relative to the torque converter 20. When the transmission input shaft is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. Components that are non-rotatably fixed rotate in unison. When the speed of the turbine 26 approaches that of the impeller 24, fluid tends to flow around the centerline of the torque converter, causing the one-way clutch 32 to overrun.

The torque converter 20 may include a bypass clutch 36 that mechanically connects the turbine 26 to the cover 22 to bypass the hydrodynamic power flow path of the torque converter 20. The bypass clutch 36 is often engaged during cruise to improve fuel efficiency. The bypass clutch 36 may include a clutch disc 66 operated by a clutch piston 60. The clutch disc 66 may include at least one friction material 70 disposed thereon. The clutch disc 66 is sandwiched between the clutch piston 60 and the cover 22 in the illustrated example, but may engage with a friction plate that is fixed to the cover 22 in other embodiments. The clutch 36 is engaged by moving the clutch piston 60 towards the cover 22 to frictionally lock the clutch disc 66 to the cover 22. The turbine 26 is fixed to the clutch disc 66 by a damper 78. Thus, the turbine 26 is fixed relative to the cover 22 when the bypass clutch 36 is fully engaged to bypass the hydrodynamic power flow path and instead mechanically couple the engine to the transmission. Other bypass clutch designs may be used in the torque converter 20.

The clutch piston 60 may be hydraulically actuated by supplying fluid, e.g., oil, to an apply chamber 62 or a compensation chamber 64. The apply chamber 62 and the compensation chamber 64 may be fluidly isolated from the hydrodynamic chamber 38 and from each other. Two chambers may be considered to be fluidly isolated if they are capable of having meaningfully different pressures. The torque converter 20 includes components that cooperate to define the apply chamber 62 and the compensation chamber 64.

The cover 22 is attached to a pilot hub 80 that is generally located at the center of the torque converter 20. The pilot hub 80 includes a nose portion 82 and a disc portion 84 that extends radially outward from the nose portion 82. An outer circumferential surface 92 of the disc portion 84 sealably engages an inner circumferential surface 94 of the piston 60. A seal 96 is disposed between the piston 60 and the disc portion 84. A plate 98 includes an outer edge that sealably engages the piston 60. A seal 100 is disposed between the piston 60 and the plate 98. The plate 98, the piston 60, and the disc portion 84 cooperate to define the apply chamber 62. Another seal 102 is placed between an outer tip of the piston 60 and the cover 22 to seal the compensation chamber 64.

The disc portion 84 may define passageways that open into the apply chamber 62 and the compensation chamber 64. For example, a first passageway 86 is configured to supply fluid to the apply chamber 62. The first passageway 86 includes an opening defined on an inner circumferential surface 88 of the pilot hub 80. A second passageway 90 is configured to supply fluid to the compensation chamber 64. The second passageway 90 includes an opening that is also on the surface 88 and axially forward of the opening of the first passageway 86. The pilot hub 80 may include multiple first and second passageways 86, 90 that are circumferentially arranged around the pilot hub 80. Transmission fluid may be supplied to the first and second passageways 86, 90 through the transmission input shaft, which includes associated passageways.

Figure 2:
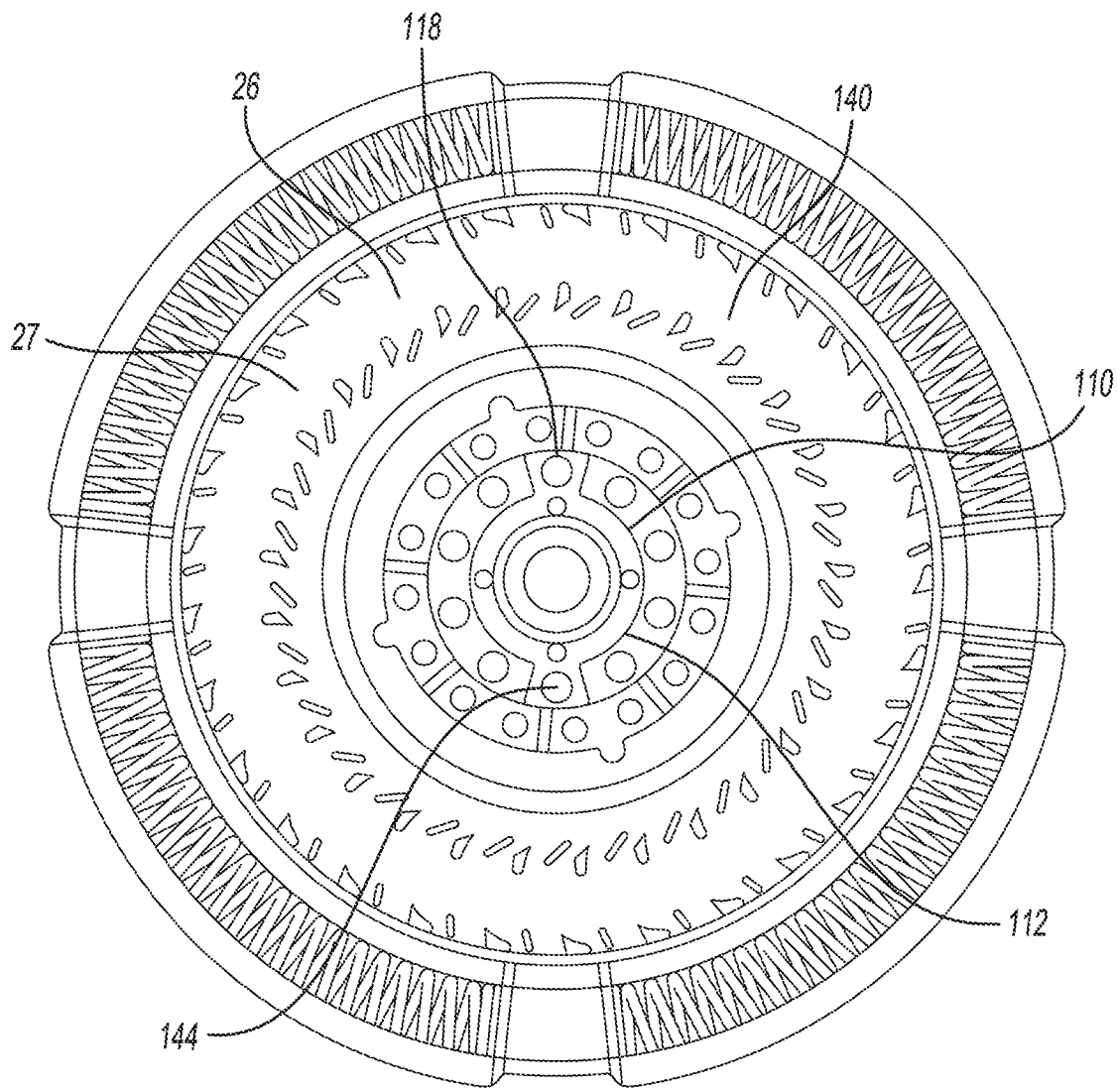
FIG. 2 is front view of a flow-control hub and a turbine of the torque converter.

Referring to FIGS. 1 and 2, a flow-control sleeve 110 is used to route the fluid from the transmission input shaft to the appropriate passageways 86, 90. The flow-control sleeve 110 is a separate component from the turbine hub 34 and is located axially forward of the turbine hub 34. The flow-control sleeve 110 may include a main portion 112 that is a circular cylinder having an outer circumferential surface 114 and an inner circumferential surface 116. One or more radially extending tabs 118 project outwardly from a rear end of the main portion 112. The flow-control sleeve 110 defines one or more orifices 120 extending from the inner circumferential surface 116 to the outer circumferential surface 114. The orifices 120 allow fluid to pass through the flow-control sleeve 110. In the illustrated embodiment, the orifices 120 are in fluid communication with the passageway 86 for supplying fluid to the compensation chamber 64. A pair of seals 122, 124 border the orifices 120 to guide fluid into the passageway 86 and block other fluid flows from entering the passageway 86. The passageway 85 receives fluid that flows around the front of the flow-control sleeve 110. The flow-control sleeve 110 may be a metal stamping, such as steel. The flow-control sleeve 110 is rotationally fixed relative to the turbine 26.

Figure 3:
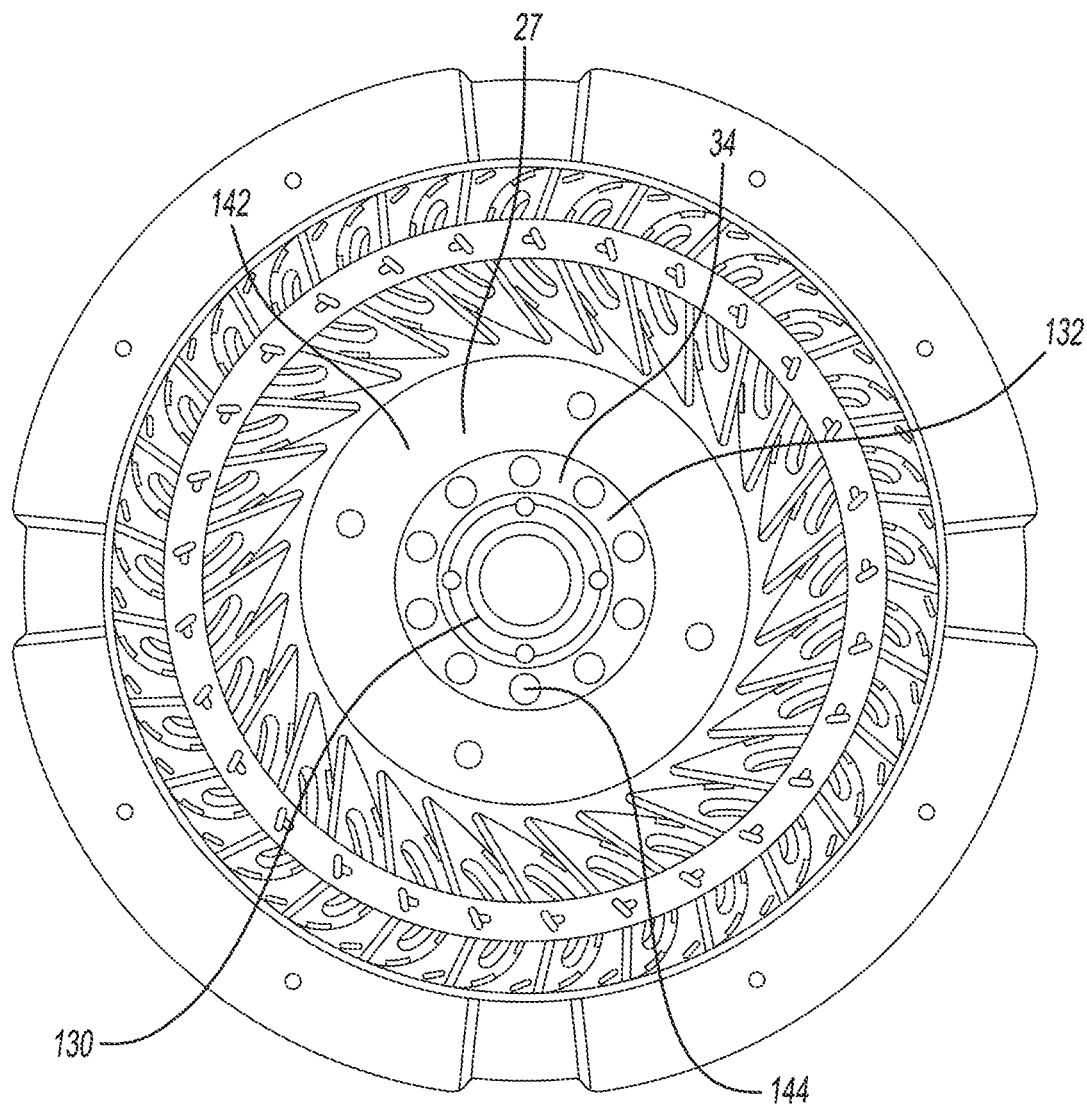
FIG. 3 is rear view of the turbine and a turbine hub.

Referring to FIGS. 1 and 3, the turbine hub 34 may also be a metal stamping, such as steel. The turbine hub 34 may include an axially extending ring 130 and a radially extending flange 132 that is attached to the shell 27. The ring 130 includes an outer circumferential surface 134 and an inner circumferential surface 136 that defines axially extending teeth 133, e.g., an internal spline, that mesh with teeth of the transmission input shaft. The diameter of the inner circumferential surface 136 may be larger than the diameter of the inner circumferential surface 116 of the sleeve 110.

Referring to FIGS. 1, 2, and 3, the flow-control sleeve 110 and the turbine hub 34 rotate in unison due to their common attachment to the shell 27 of the turbine 26. The turbine shell 27 may include a front face 140 disposed against the one or more tabs 118 of the flow-control sleeve 110 and may include a back face 142 disposed against the flange 132. One or more fasteners may connect the one or more tabs 118, the shell 27, and the flange 132. For example, a fastener 144 extends through the tab 118, the shell 27, and the flange 132. The fastener 144 may be a rivet (as illustrated) or a removable fastener such as a screw, a bolt, etc. In the illustrated embodiment, two tabs 118 and two fasteners 144 are used, but more or less may be used in other embodiments. Other fasteners, such as rivets, may connect only between the flange 132 and the shell 27. These components can also be joined via welding, bonding, or the like.

Figure 4:
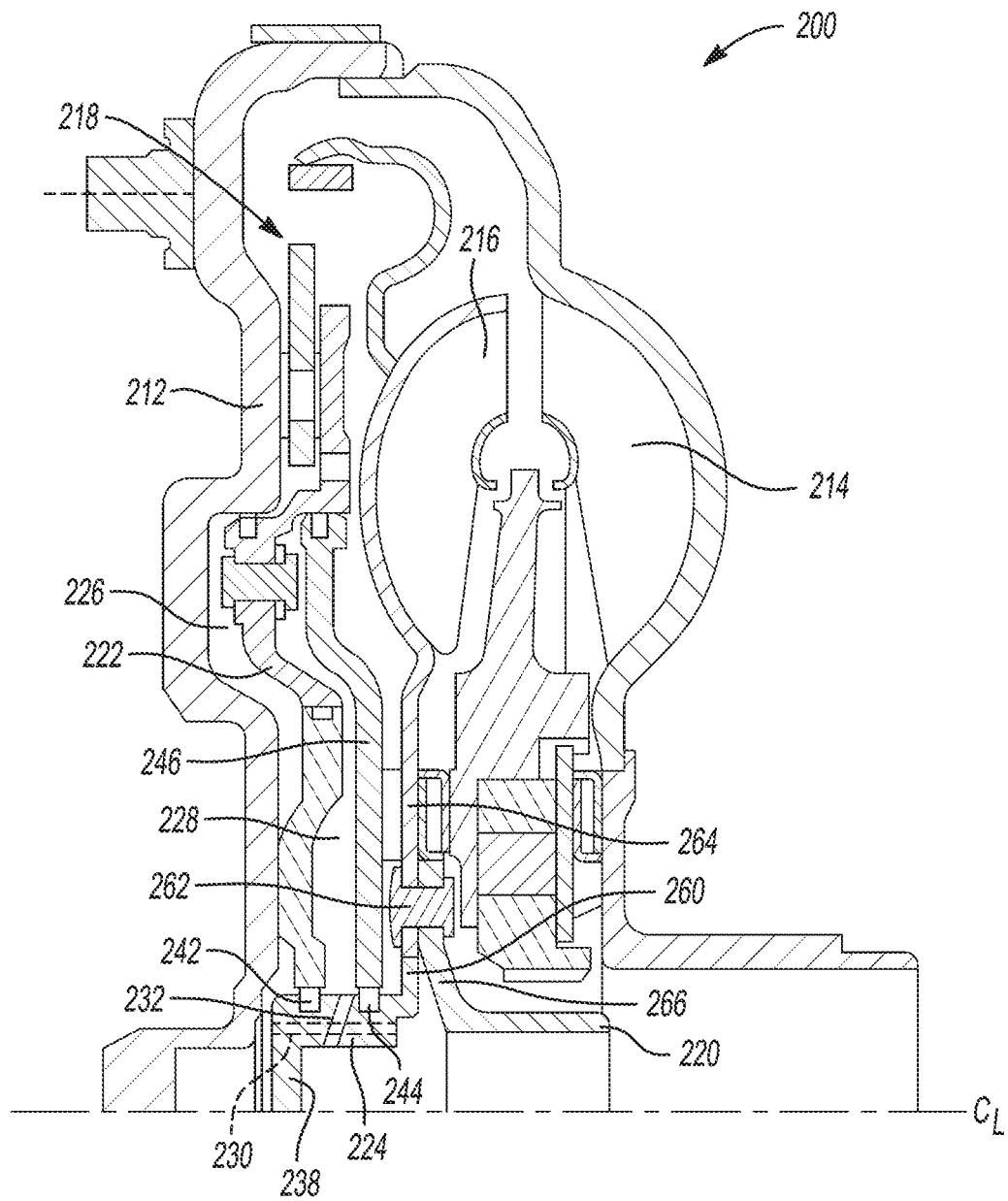
FIG. 4 is a schematic cross-sectional view of another torque converter.

Referring to FIG. 4, another torque converter 200 includes a cover 212 configured to receive torque from a crankshaft of an internal combustion engine or other actuator. The torque converter 200 also includes an impeller 214, a turbine 216, a bypass clutch 218, and a turbine hub 220. The turbine hub 220 may be the same or similar to the turbine hub 34. The bypass clutch 218 includes an axially-displaceable piston plate 222 (also referred to as a piston) configured to directly connect the cover 212 to the turbine hub 220.

The torque converter 200 has multiple chambers for receiving fluid (e.g., automatic transmission fluid), including a compensation chamber 226 and an apply chamber 228, each of which are partially bound by the piston 222. In operation, fluid pressure in the apply chamber 228 is configured to displace the piston 222 in a first axial direction (e.g., to the left in FIG. 4) to close the bypass clutch 218 and rotationally lock the turbine hub 220 with respect to cover 212. To disengage or open the bypass clutch 218, fluid pressure in the compensation chamber 226 is configured to displace the piston 222 in a second axial direction opposite the first axial direction (e.g., to the right in FIG. 4) to open the bypass clutch 218 and allow independent rotation of the cover 212 and the turbine hub 220. A spring (not shown) may also help de-stroke the piston.

The torque converter 200 includes a flow-control sleeve 224 that is provided with a plurality of fluid channels (also known as orifices), e.g., first fluid channel 230 and second fluid channel 232, to allow the fluid to enter and exit the various fluid chambers, such as compensation chamber 226 and apply chamber 228. The first fluid channel 230 is configured to fluidly couple the compensation chamber 226 with a first flow channel formed in the transmission input shaft. The second fluid channel 232 is configured to fluidly couple the apply chamber 228 with a second flow channel between an end of the transmission input shaft and the sleeve 224. Although the first fluid channel 230 and second fluid channel 232 are shown in the same section view, it should be understood that the fluid channels 230, 232 are circumferentially offset as evidenced by the dashed lines on fluid channel 230 where the channels 230, 232 appear to intersect. That is, the fluid channels 230, 232 are independent of one another so that there is no fluid exchange between the first fluid channel 230 and the second fluid channel 232.

The sleeve 224 may have an axial end 238 that is closed off. This provides an axial boundary or closure on the sleeve 224. This axial end 238 axially separates the compensation chamber 226 from the second flow channel that feeds into the apply chamber 228. The sleeve 224 is therefore designed to have two crossing (e.g., radially overlapping) flow paths formed therein.

A pair of seals 242, 244 border the channel 232. A compensation plate 246 provides an axial boundary for the apply chamber 228. One of the seals 242 is provided between the sleeve 224 and the piston 222 to allow relative axial movement therebetween, while the other seal 244 is provided between the sleeve 224 and the compensation plate 246 to allow relative axial movement therebetween.

The crossing of the channels 230, 232 within the flow-control sleeve 224 allows each flow path to proceed to the desired pressure chamber (i.e., the apply chamber 228 and the compensation chamber 226, respectively). This can eliminate the need for a complex, machined cross-flow cover hub. Rather than machining a cover hub, a single sleeve 224 can be made with two crossing flow channels 230, 232 that can be drilled therein, which can be much more economical with reduced labor and manufacturing complexities. Similar to above, the sleeve 224 may be a stamped component. The sleeve 224 may include one or more tabs 260 attached to the turbine shell 264 as described above. For example, one or more fasteners 262 may extend through the tab 260, the turbine shell 264, a flange 266 of the turbine hub 220.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST torque converter 20
shell 21
cover 22
blades 23
impeller 24
turbine 26
shell 27
stator 28
blades 29
one-way clutch 32
turbine hub 34
bypass clutch 36
hydrodynamic chamber 38
clutch piston 60
apply chamber 62
compensation chamber 64
clutch disc 66
friction material 70
damper 78
pilot hub 80
nose portion 82
disc portion 84
passageway 85
passageway 86
inner circumferential surface 88
passageways 90
outer circumferential surface 92
inner circumferential surface 94
seal 96
plate 98
seal 100
seal 102
flow-control sleeve 110
main portion 112
outer circumferential surface 114
inner circumferential surface 116
tab 118
orifices 120
seal 122
seal 124
ring 130
flange 132
teeth 133
outer circumferential surface 134
inner circumferential surface 136
front face 140
back face 142
fastener 144
torque converter 200
cover 212
impeller 214
turbine 216
bypass clutch 218
turbine hub 220 piston 222
flow-control sleeve 224
compensation chamber 226
apply chamber 228
fluid channel 230
channel 230
channel 232
axial end 238
seal 242
seal 244
seal 244
compensation plate 246
tabs 260
fasteners 262
turbine shell 264
flange 266

What is claimed is:

1. A torque converter comprising:
an impeller;
a turbine configured to fluidly couple with the impeller;
a bypass clutch including a hydraulically actuated piston, an apply chamber, and a compensation chamber;
a turbine hub attached to the turbine and having an inner circumferential surface defining axially extending teeth configured to connect with a shaft; and
a flow-control sleeve axially spaced from the turbine hub and including a radial tab portion attached to the turbine, the flow-control sleeve defining an orifice in fluid communication with the apply chamber or the compensation chamber;
wherein the turbine includes a shell having a first face disposed against the tab portion and a second face, opposite the first face, disposed against the turbine hub.

2. The torque converter of claim 1, wherein the flow-control sleeve further includes an inner circumferential surface and an outer circumferential surface, and the orifice extends from the inner circumferential surface to the outer circumferential surface of the sleeve.

3. The torque converter of claim 2, wherein the flow-control sleeve further includes a pair of seals disposed on the outer circumferential surface on opposite sides of the orifice.

4. The torque converter of claim 1 further comprising a fastener extending through the turbine, the turbine hub, and the tab portion.

5. The torque converter of claim 1, wherein the turbine hub and the flow-control sleeve are non-rotatably fixed relative to each other.

6. The torque converter of claim 1, wherein the orifice is in fluid communication with the compensation chamber.

7. The torque converter of claim 6, wherein the orifice is a first orifice and the flow-control sleeve defines a second orifice in fluid communication with the apply chamber.

8. The torque converter of claim 7, wherein the flow-control sleeve further includes an inner circumferential surface, an outer circumferential surface, a first radial face, and a second radial face, and wherein the first orifice extends from the first face to the second face, and the second orifice extends from the inner circumferential surface to the outer circumferential surface of the flow-control sleeve.

9. The torque converter of claim 1, wherein the turbine hub and the flow-control sleeve are stampings.

10. The torque converter of claim 1, wherein the turbine hub includes an axially extending ring defining the axially extending teeth and a radially extending flange that is attached to the turbine.

11. A torque converter comprising:
a cover;
an impeller including impeller blades non-rotatably fixed relative to the cover;
a turbine including a shell and turbine blades configured to fluidly couple with the impeller blades;
a bypass clutch including a friction disc and a hydraulically actuated piston;
an apply chamber configured to stroke the piston into the friction disc to engage the bypass clutch;
a compensation chamber configured to de-stroke the piston to disengage the bypass clutch;
a turbine hub attached to the shell and having an inner circumferential surface defining axially extending teeth configured to connect with a shaft; and
a flow-control sleeve including a radial tab portion attached to the shell, the flow-control sleeve defining an orifice that connects a fluid passage of the shaft in fluid communication with one of the apply chamber and the compensation chamber;
wherein the turbine hub includes an axially extending ring defining the axially extending teeth and a radially extending flange that is attached to the shell, and wherein the shell includes a first face disposed against the tab portion and a second face disposed against the flange.

12. The torque converter of claim 11 further comprising a fastener extending through the tab portion, the shell, and the flange.

13. The torque converter of claim 11, wherein the flow-control sleeve further defines another orifice in fluid communication with the other of the apply chamber and the compensation chamber.

14. The torque converter of claim 11, wherein the turbine hub and the flow-control sleeve are separate stampings.

15. A torque converter comprising:
an impeller;
a turbine configured to fluidly couple with the impeller;
a bypass clutch including a hydraulically actuated piston, an apply chamber, and a compensation chamber;
a turbine hub fixed to the turbine and having an inner circumferential surface defining axially extending teeth configured to connect with a shaft; and
a flow-control sleeve axially spaced from the turbine hub and fixed to the turbine, the flow-control sleeve defining a first orifice in fluid communication with the apply chamber and a second orifice in fluid communication with the compensation chamber;
wherein the turbine includes a shell having opposing first and second faces, and the turbine hub includes a radially extending flange fixed to the first face and the flow-control sleeve includes a radially extending tab portion fixed to the second face.

16. The torque converter of claim 15 further comprising a fastener extending through the shell, the tab portion, and the flange.

* * * * *